Sept. 29, 1936.   F. W. MANNING   2,055,872
FABRIC FILTER
Filed Aug. 29, 1934   2 Sheets-Sheet 1

INVENTOR:
Fred W. Manning

Sept. 29, 1936.   F. W. MANNING   2,055,872
FABRIC FILTER
Filed Aug. 29, 1934   2 Sheets-Sheet 2
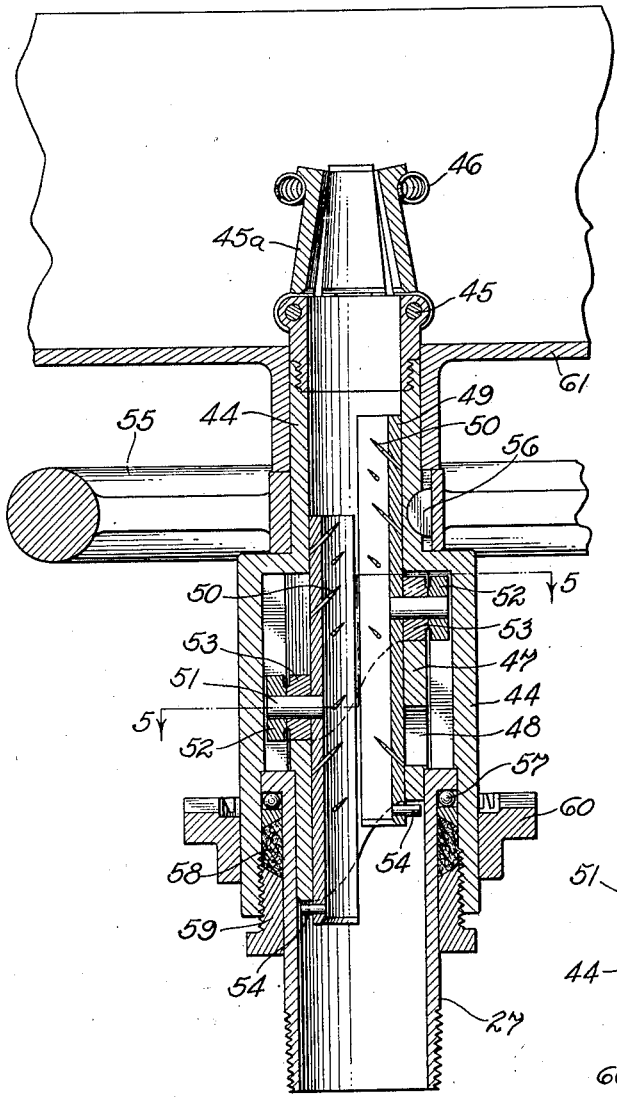
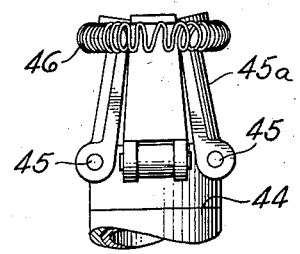
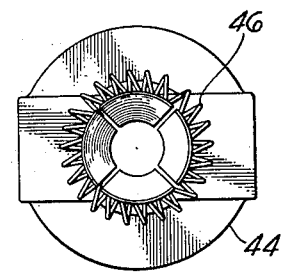
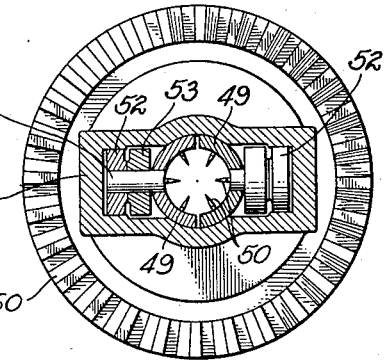
INVENTOR:
Fred W. Manning Patented Sept. 29, 1936

2,055,872

UNITED STATES PATENT OFFICE 2,055,872

FABRIC FILTER

Fred W. Manning, Altadena, Calif., assignor to F. W. Manning Company, Ltd., Los Angeles, Calif., a corporation of California Application August 29, 1934, Serial No. 741,904

7 Claims. (Cl. 210—177)

This invention relates to improvements in the treatment of fluids and solids by filtration, and particularly to the removal of solids from liquids by magazine type of fabric filters, and the subsequent removal of soakage from the exhausted filter material and filtered solids. This application is a continuation-in-part of my application Serial No. 490,353, filed October 22, 1930.

It has been the practice heretofore to accomplish the separation of solids from liquids by means of one thickness or layer of fabric, and if the liquid happened to be of a slimy, mucilaginous, or colloidal character, or otherwise difficult to filter, the one thickness was first given a thin precoating of some treating agent such as kieselguhr or other porous substance, so that by means of the collection of impurities on, or through the depth of, the one thin coating, clarity and a better rate of filtrate flow could be obtained. Such methods result in constantly decreasing filtering rates and increasing filtering pressures until finally there must be an interruption in the filtering operation for the purpose of extracting the soakage from the filtered solids and filter fabric by air and steam, etc., cleaning the filter fabric after the soakage has been removed, and returning for further filtration the cloudy filtrate of the succeeding cycle. Or, if repeating the cycle of operations as just described was not practical, as in the case of small filters for motor vehicles etc., the usual method was to obtain filtering speed at the expense of clarity by making the filter fabric sufficiently porous to permit the finer impurities to pass on through, and in this way the fabric could be used for long periods of time before replacement was necessary. Furthermore, liquids of such character are often volatile, and often required to be handled at high pressures and temperatures, and such conditions have generally been found heretofore to be incompatible with continuous operations.

As distinguished from such prior methods, the present invention includes the advantage of a substantially continuous operation that can be accomplished out of contact with the air, and in which a constant filtering rate and perfect clarity can be maintained at any desired pressure and temperature.

In accordance with my invention, a reserve of filter fabric such as fibrous material backed by scrim, the manufacture of which is described in my Patents 1,782,784; 1,782,785; and 1,786,669, is inserted in a suitable container in the form of a plurality of layers, and the fluid inlet surface layer, as it becomes clogged, is removed from the reserve fabric at sufficient speed to maintain the filtering rate and pressure substantially constant; and by means of an extruding device, the filtered solids are wrapped within the removed fabric, and the soakage expressed or wrung therefrom and returned to the filter; and the compacted fabric and solids then extruded from the filter chamber. Such an apparatus is particularly suitable for the handling of comparatively small quantities of liquid, as in the reclamation of oils, etc.

The invention is exemplified in the following description, and one form of apparatus is illustrated by way of example in the accompanying drawings, in which:

Fig. 2 is a vertical section of the fabric twisting and extruding mechanism.

Fig. 3 is the outlet portion of the extruding mechanism in elevation.

Fig. 4 is a plan view of the outlet of the extruding mechanism.

Fig. 5 is a cross section of the fabric twisting and extruding mechanism taken on line 5—5 of Fig. 2.

Figure 1:
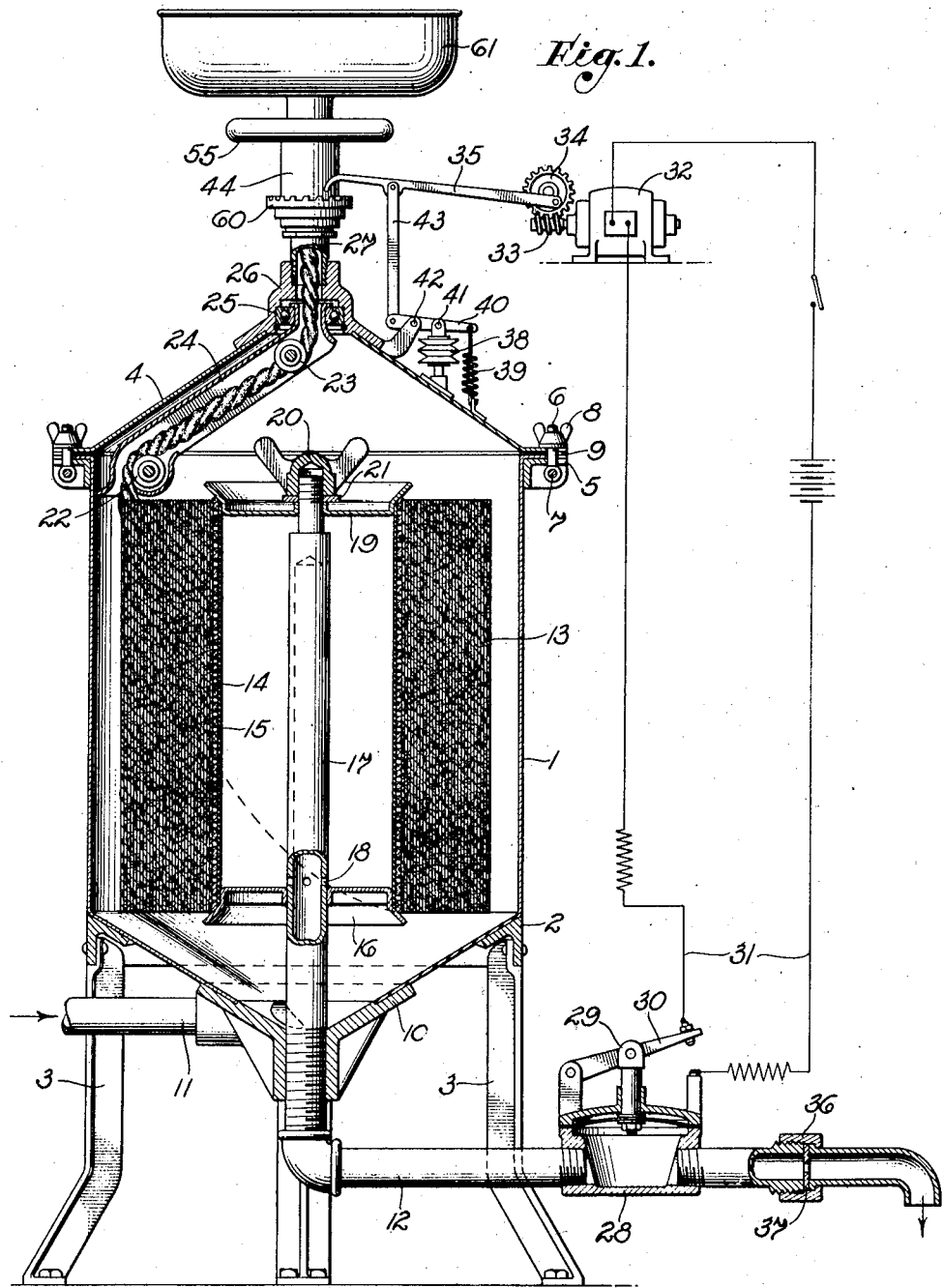
Fig. 1 is the complete apparatus, partly in elevation and partly in vertical section.

Referring more specifically to the drawings by reference characters, Fig. 1 shows the filter tank 1 to be supported by the angle ring 2, to which is attached the legs 3; the upper end of the tank being closed by a cover 4 by means of a bolt ring 5, eye bolts 6, eye pins 7, wing nuts 8, and a gasket 9; and the lower end by a bottom cone casting 10, to which is attached the feed inlet pipe 11, and the filtrate outlet pipe 12. The filter fabric roll 13 is wound upon a perforated cardboard tube 14, and the latter is slipped over the perforated metal tube 15, which supports the former tube against collapse during operation of the filter. The tubes form an enclosure for the filtrate, and the unfiltered fluid is prevented from entering therein, by means of a bottom conical end plate 16 rigidly fixed to the filtrate pipe 17, the latter having filtrate openings 18; and the top conical end plate 19, which is held in position by a stud 20 in the upper end of the filtrate pipe. The metal tube is shorter than the cardboard tube in order that fluid-tight joints may be made between the ends of the cardboard tube and the conical end plates when the wing nut 20 and washer 21 are screwed down into position. The filter fabric, upon being removed from the outside of the roll, is drawn over pulley 22, and under pulley 23, both being positioned in the swivel arm 24; and this arm is supported by, and caused to rotate freely on, a ball bearing 25 positioned in the top cone casting 26, into which is screwed the fabric outlet pipe 27.

Fig. 1 also shows two methods for controlling the fabric removal mechanism by the filtrate flow, and by pressure in the filter tank. In the filtrate outlet line there may be inserted a diaphragm regulating valve 28, the movement of whose levers 29 and 30 control the electric circuit 31, which energizes the motor 32. Worm 33 on the motor shaft meshes with worm gear 34, which acts as a crank to reciprocate the pawl shaft 35, which in turn moves the fabric twisting and extruding mechanism. A coupling 36, which encloses a calibrating disc 37, is also inserted in the filtrate outlet line to provide the necessary pressure to move the diaphragm valve. Or, the diaphragm valve and the calibrating disc may be removed and the motor made to run continuously. In such a case, an expansion valve 38 may be attached to any convenient portion of the filter tank; and by means of a coil spring 39, levers 40 and 41, fulcrum 42, and a connecting rod 43, the pawl shaft may be caused to drop into operating position only when the liquid pressure reaches a predetermined point through clogging of the filter fabric.

Figs. 2 to 5 show the fabric twisting and extruding mechanism attached to the upper end of the fabric outlet pipe. This comprises a housing 44 to whose outer end are hinged by means of pins 45, a plurality of compacting jaws 45a, which are restrained from opening by means of a coiled spring 46 passing around their outer ends. A cam sleeve 47 having an opening 48, is rigidly attached to the outer end of the fabric outlet pipe; and this sleeve, in conjunction with the cylindrical portion of the housing, guide the feeding jaws 49 in their up and down movements. Steel pins or teeth 50 are fixed at an upward angle to the inside of these feeding jaws; and to their outer sides are attached pins 51 to take the guiding rollers 52 and 53; and to their lower ends are fastened the return pins 54. A hand wheel 55 is attached by a key 56 to the upper cylindrical part of the housing, and the turning of the latter is further facilitated by the ball bearing 57 positioned above the packing 58, which is held in place by gland 59; and to the lower end of the housing is rigidly attached a ratchet wheel 60 to be used when the motor is required for operating the mechanism. A fabric receiver basin 61 is placed over the upper end of the housing.

The operation of the apparatus has been in part indicated in connection with the foregoing description. The liquid to be filtered enters the sump of the filter in a tangential direction from the feed line 11. In this way solids in the liquid are prevented from settling, and are carried up onto the outer layers of the annular filter roll by the passage therethrough of the liquid. The filtered liquid leaves the inside of the filter roll through the filtrate pipes 17 and 12, regulating valve 28, and calibrating disc 37. The opening through the calibrating disc is sufficient to give the flow required but as the normal flow through the filter roll is greater, pressure is maintained in the filtrate receiver, which in this case, may be considered as tube 14 on which the fabric is rolled, and the filtrate pipes 17 and 12. If the flow rate drops below what may pass through the calibrating disc, pressure will cease to exist in the filtrate receiver and the diaphragm arm 30 will close the electric circuit, which energizes the motor 32. The operation of the motor results in the pawl shaft 35 causing the ratchet wheel 60, and attached housing 44 to rotate. As the sleeve cam 47 is fixed rigidly to the stationary fabric outlet pipe 27, and the movement of the guiding rollers 52 is constrained by the housing, and the movement of the rollers 53 and return pins 54 by the cam, the rotation of the housing will cause the feeding jaws to rotate and simultaneously reciprocate in their alternate up and down movements. These movements of the feeding jaws with their teeth set in the jaws at an upward angle, will result in the fabric being pulled and simultaneously twisted and packed into the cylindrical end of the housing from which it is extruded as soon as the packing is sufficient to overcome the spring tension holding the outer ends of the packing jaws together. The swivel arm 24 makes it possible for the twisting of the fabric to be carried all the way down to the filter roll, and for the filtered solids to be wrapped within the utilized fabric simultaneously with the removal of the surface layer from the filter roll. The twisting of the fabric may be made sufficient to very thoroughly remove the soakage from the exhausted fabric and filtered solids; and the packing of the twisted fabric into the upper cylindrical end of the housing may also be used to supplement the former operation, in addition to preventing escape of the fluid under pressure in the filter chamber. Any liquid expressed in the packing cylinder may drain back between the jaws and the housing through opening 48 into the fabric outlet pipe.

It will thus be seen from the foregoing description that the removal of the utilized fabric may be accomplished by turning of the hand-wheel; or, it may be accomplished automatically and at just sufficient speed to maintain any required flow of the filtrate, or any desired pressure in the filtrate receiver, by regulating both the size of the orifice in the calibrating disc, and the strength of the diaphragm in the regulating valve 28; or, it may also be accomplished automatically and at just sufficient speed to maintain any desired pressure in the filter tank, by means of the expansion valve 38, a connecting rod 43 to the pawl shaft 35, and the motor running continuously. In the last two cases, the operation may be considered as substantially continuous; and it may be made entirely continuous by operating the motor continuously with both regulating and expansion valves disconnected. If filtration is to be accomplished under suction on the filtrate line, regulating valve 28 is used with the calibrating disc placed between the valve and the filter.

It will also be evident that in operating the filter to maintain a constant pressure within the filter chamber, or a constant pressure and flow rate in the filtrate line, the amount of filter fabric that is required to be removed from the annular roll, may vary from a small portion of one layer to several layers, depending mostly on the depth to which the impurities penetrate the annular roll.

It will be understood through the specification and appended claims that the term "layer" may mean a portion of one layer, or it may mean several layers; and that "annular" means any shape around which a plurality of layers of filter fabric may be wrapped.

I claim as my invention:
1. In a filter, the combination of: a filter wall comprising an annular roll of contiguous layers of filter fabric; a connection from the filter wall to a twisting member through which one end of the fabric is passed; means for passing a fluid to be filtered through the filter wall; and means for rotating the twisting member, whereby a surface layer of the filter wall is removed, and the filtered solids enfolded therein, and a portion of the entrained fluid extracted therefrom.

2. In a filter, the combination of: a filter wall comprising an annular roll of contiguous layers of filter fabric; a connection from the filter to a twisting member through which one end of the fabric is passed; means for passing a fluid to be filtered through the filter wall, and means for rotating the twisting member whereby a surface layer of the filter wall is removed, and the filtered solids enfolded therein, when the said solids have clogged the filter wall a predetermined amount.

3. A filter comprising: an enclosed chamber; a filter wall of contiguous layers of filter fabric within the chamber; means for passing a fluid to be filtered through the wall; and means cooperating with the wall for removing from the wall and twisting and extruding from the chamber a surface layer of filter fabric, whereby a fresh surface layer is exposed to the fluid to be filtered.

4. A filter comprising: an enclosed chamber; a filter wall of contiguous layers of filter material within the chamber; means for passing a fluid to be filtered through the wall; means cooperating with the wall for removing from the wall and compacting and extruding from the chamber a surface layer of filter material when the wall has become clogged a predetermined amount; and means controlled by the pressure of the fluid in the filtrate receiver for operating said removing means.

5. A filter comprising: a filter wall of contiguous layers of filter material; means for passing a fluid to be filtered through the wall; means cooperating with the wall for removing from the wall a surface layer of filter material, thereby exposing a fresh filter layer to the fluid to be filtered; and means controlled by the pressure of the fluid in the filtrate receiver for operating said removing means.

6. A filter comprising: a filter wall of contiguous layers of filter material; a filtrate receiver; means for passing the fluid to be filtered through the wall into the receiver; means cooperating with the wall for removing from the wall a surface layer of filter material, thereby exposing a fresh filter layer to the fluid to be filtered; and means controlled by the decrease in pressure of the filtrate in the receiver for operating said removing means.

7. In a filter, the combination of: an enclosed chamber; a filter wall of contiguous layers of filter fabric within the chamber; means for passing a fluid to be filtered through the wall; a plurality of toothed jaws for pulling, compacting and extruding from the chamber a surface layer of filter fabric as it becomes contaminated; and means for turning and reciprocating the said jaws simultaneously, whereby the said surface layer of filter fabric is twisted and compacted before being extruded from the chamber.

FRED W. MANNING.